Figure 1:
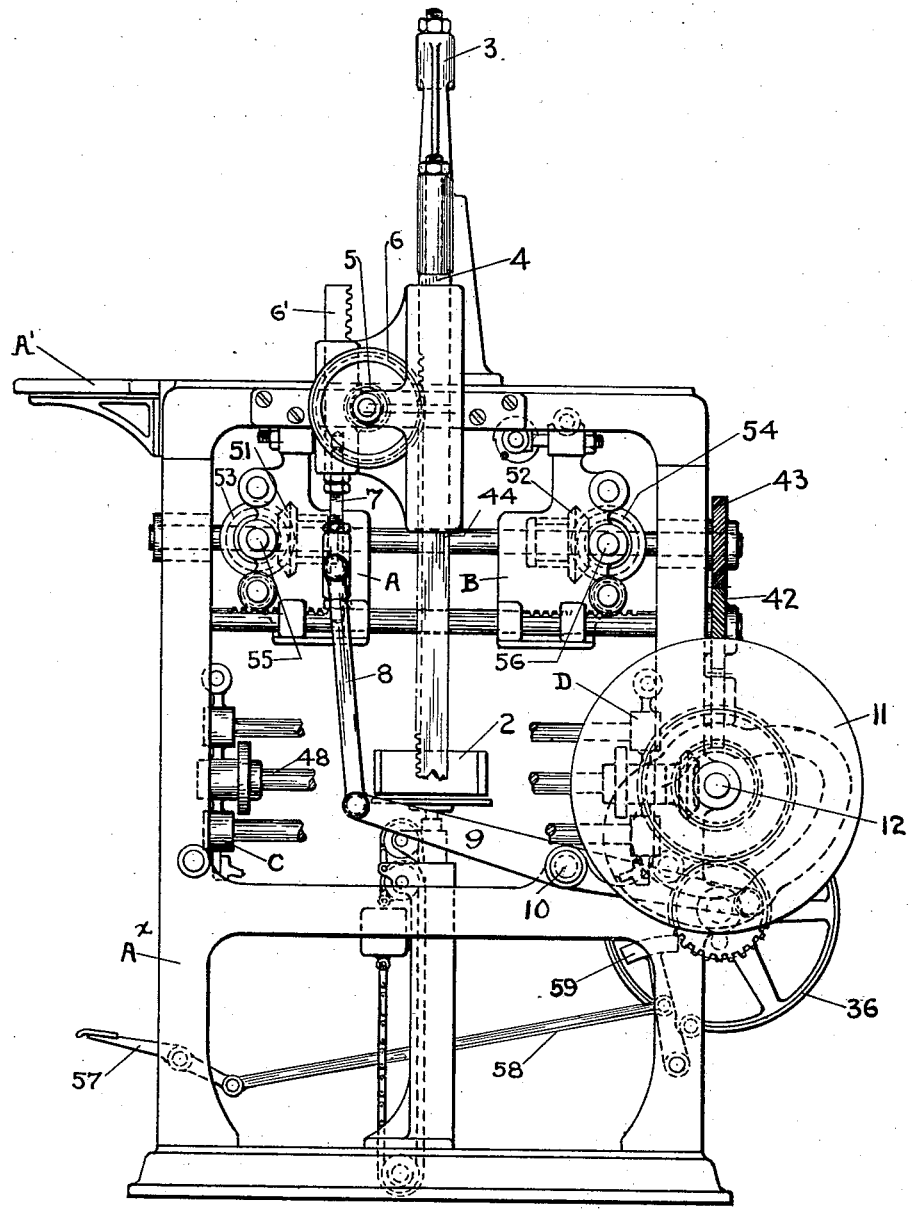

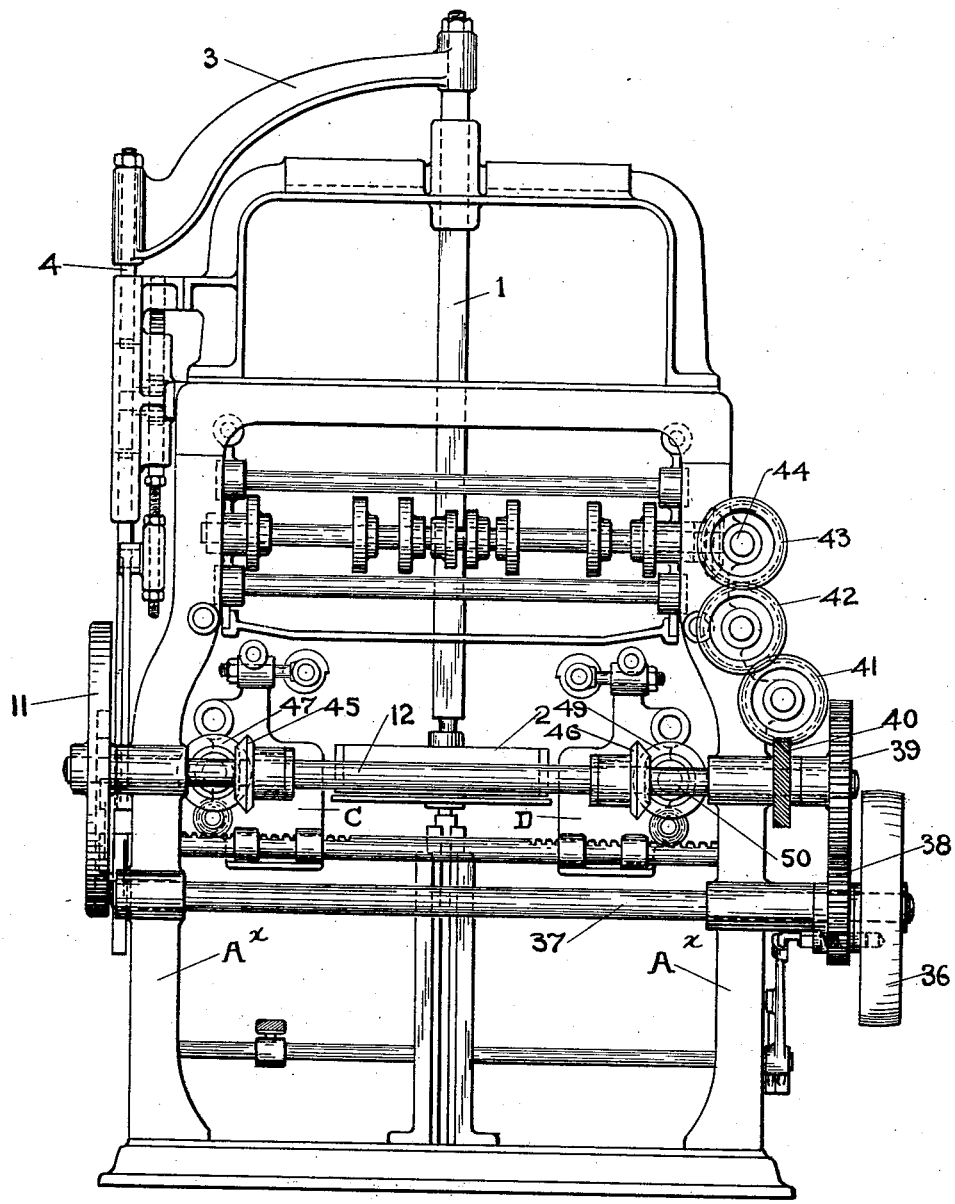

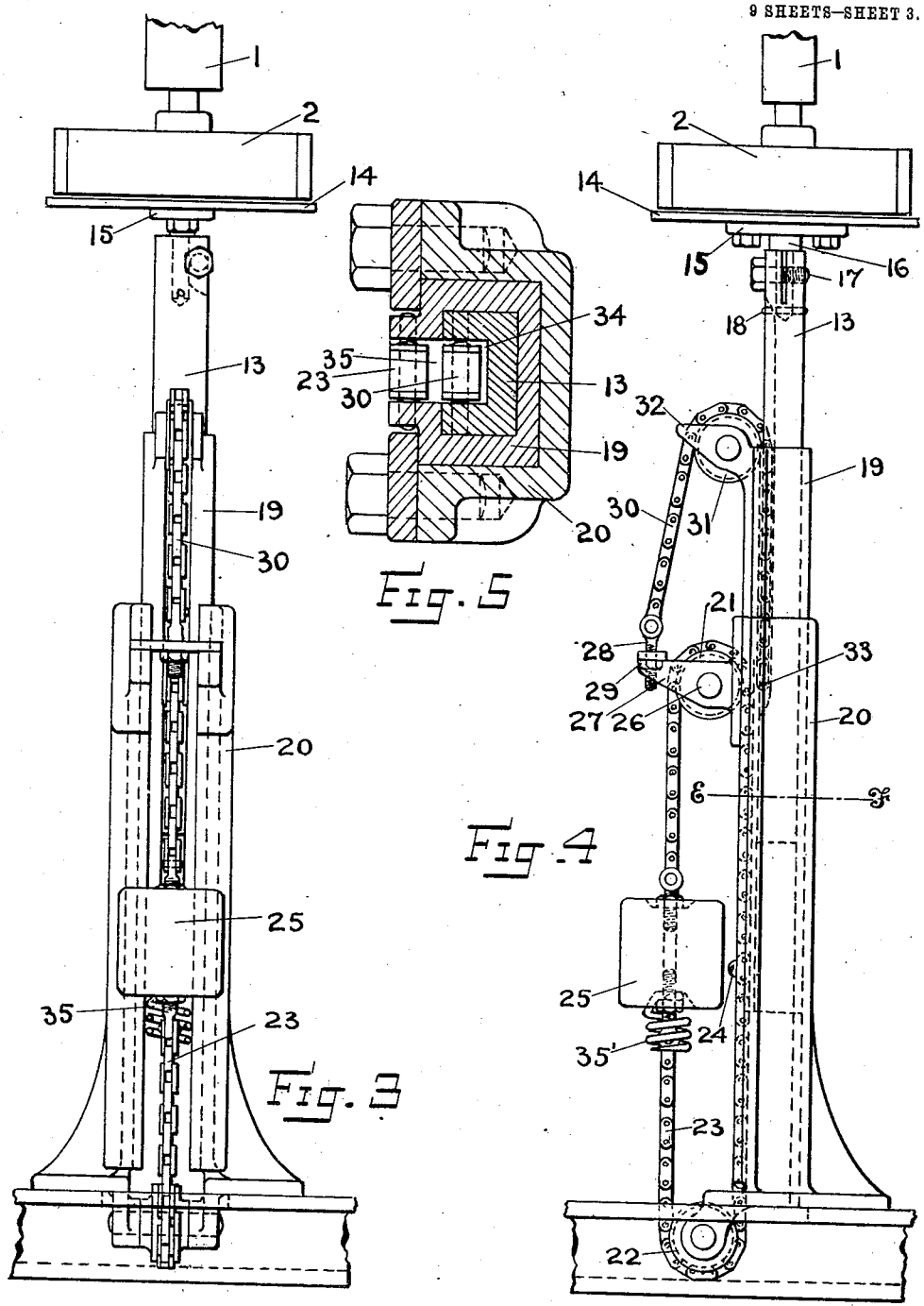

J. P. MARKERT & R. S. BOLGER.
BOX COVERING MACHINE.
APPLICATION FILED AUG. 28, 1909.
1,065,153.
Patented June 17, 1913.
9 SHEETS—SHEET 4.
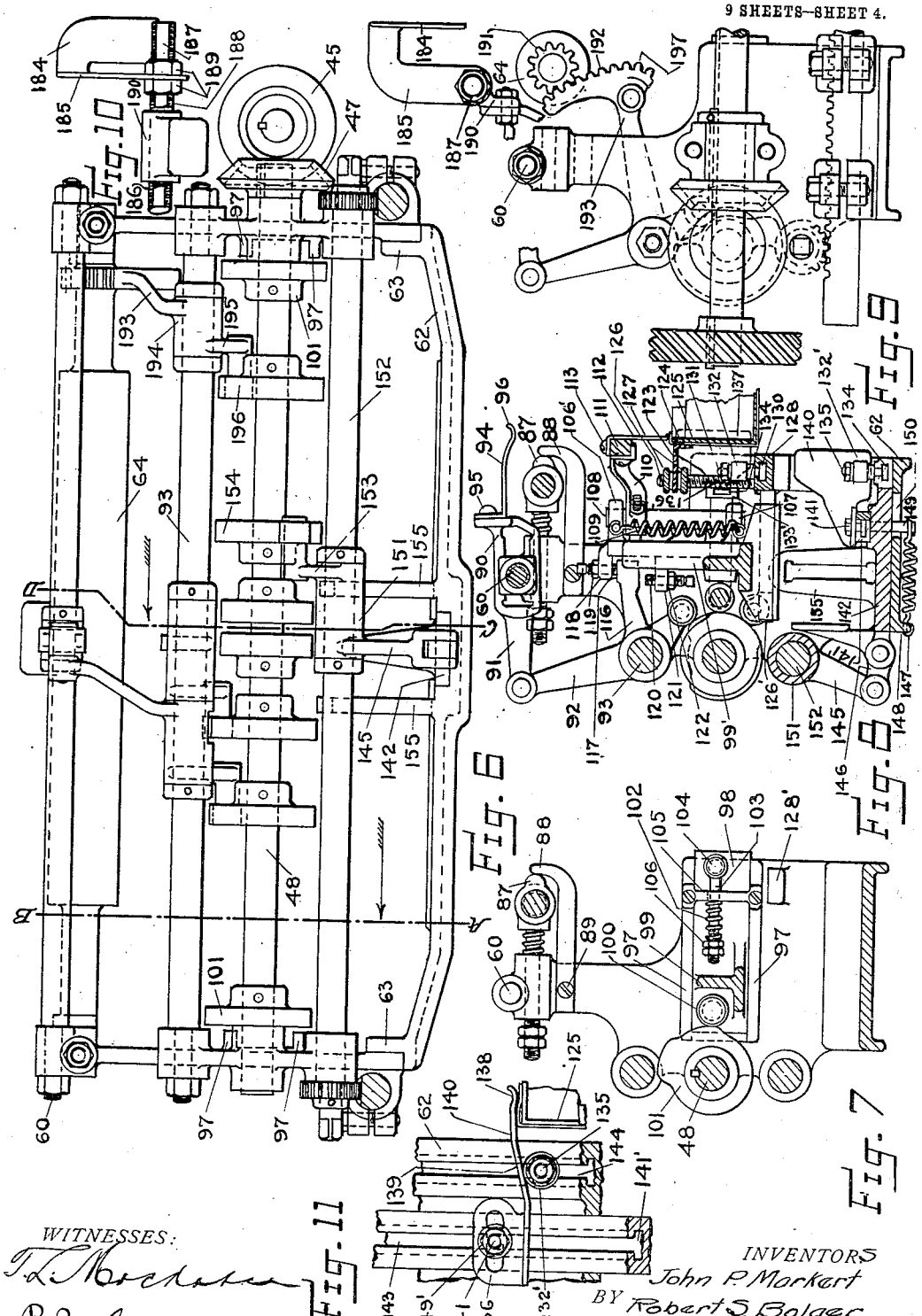
WITNESSES:
INVENTORS
John P. Markert
Robert S. Bolger
BY
ATTORNEY.

J. P. MARKERT & R. S. BOLGER.
BOX COVERING MACHINE.
APPLICATION FILED AUG. 28, 1909.
1,065,153.
Patented June 17, 1913.
9 SHEETS—SHEET 5.
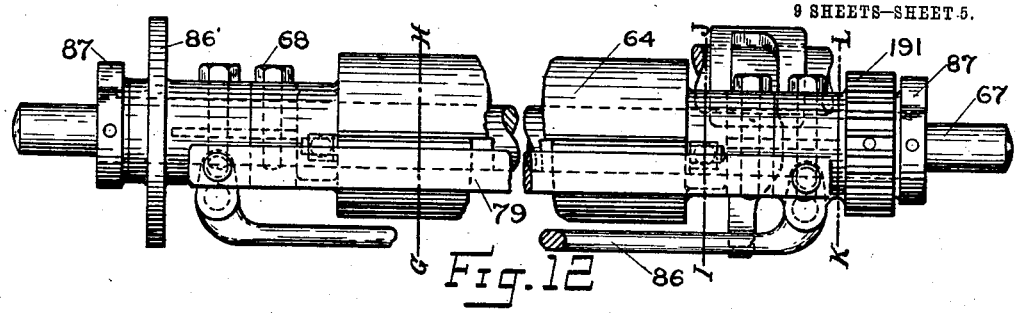
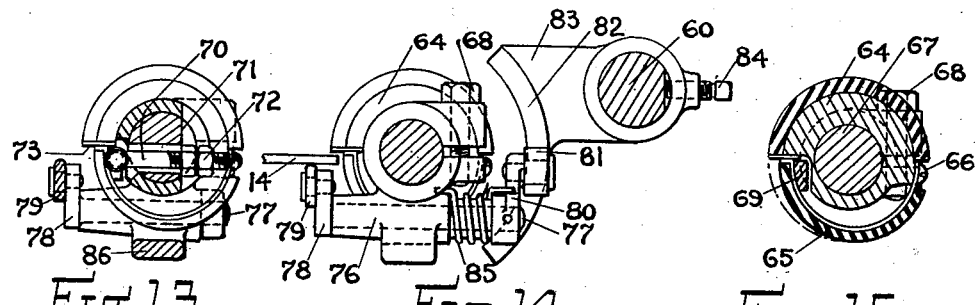
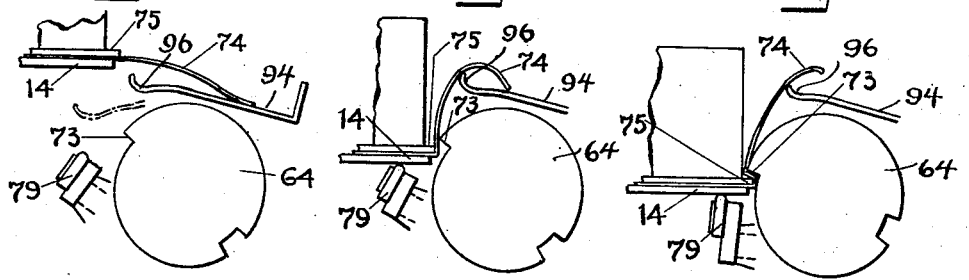
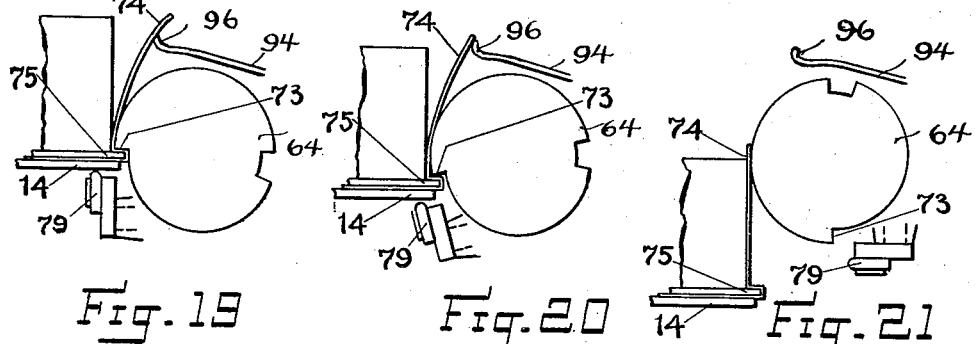
WITNESSES:
INVENTORS
John P. Markert
BY Robert S. Bolger
ATTORNEY.

J. P. MARKERT & R. S. BOLGER.
BOX COVERING MACHINE.
APPLICATION FILED AUG. 28, 1909.
1,065,153.
Patented June 17, 1913.
9 SHEETS—SHEET 6.
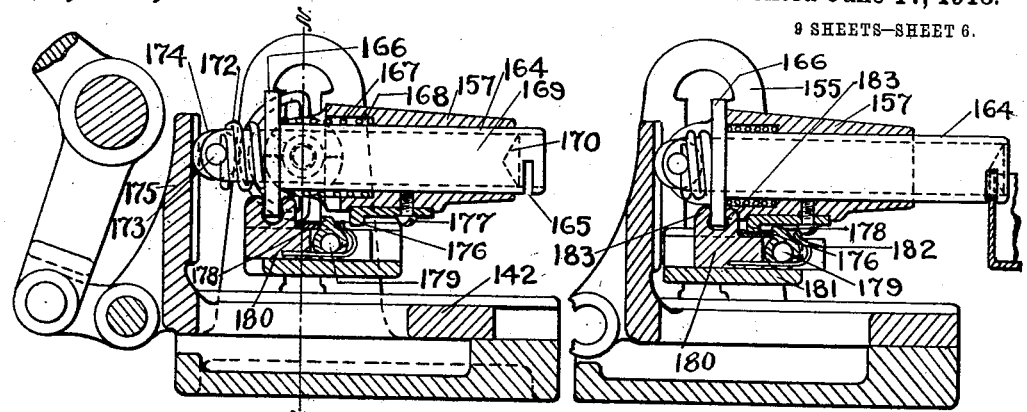
Fig. 22.  Fig. 23.
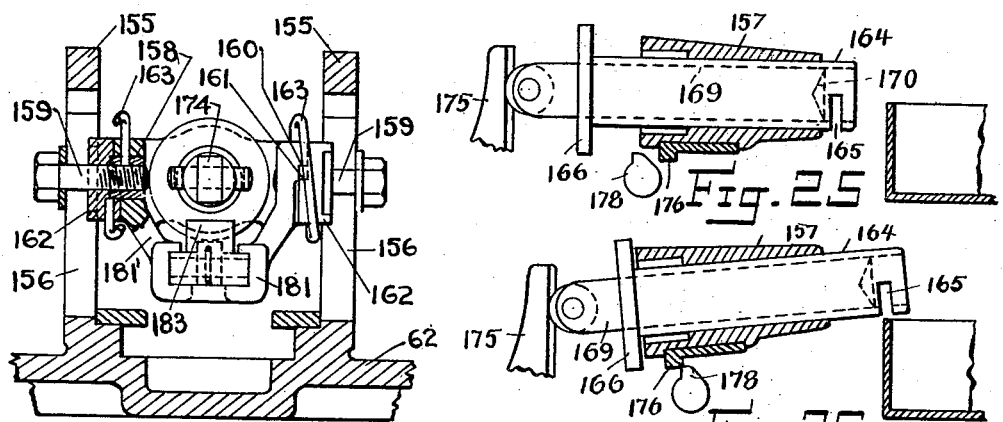
Fig. 24.  Fig. 25.  Fig. 26.
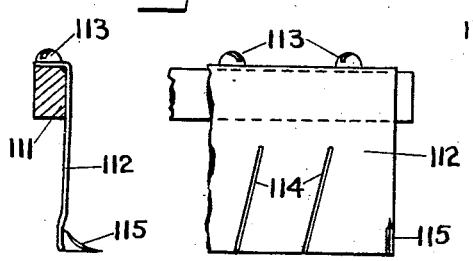
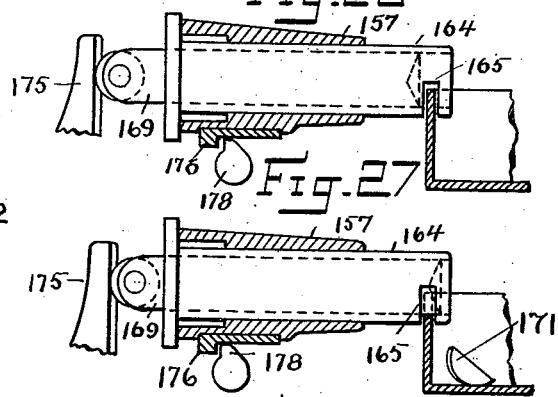
Fig. 27.  Fig. 28.
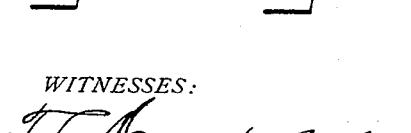
Fig. 29.  Fig. 30.
WITNESSES:
INVENTORS
John P. Markert
BY Robert S. Bolger
ATTORNEY.

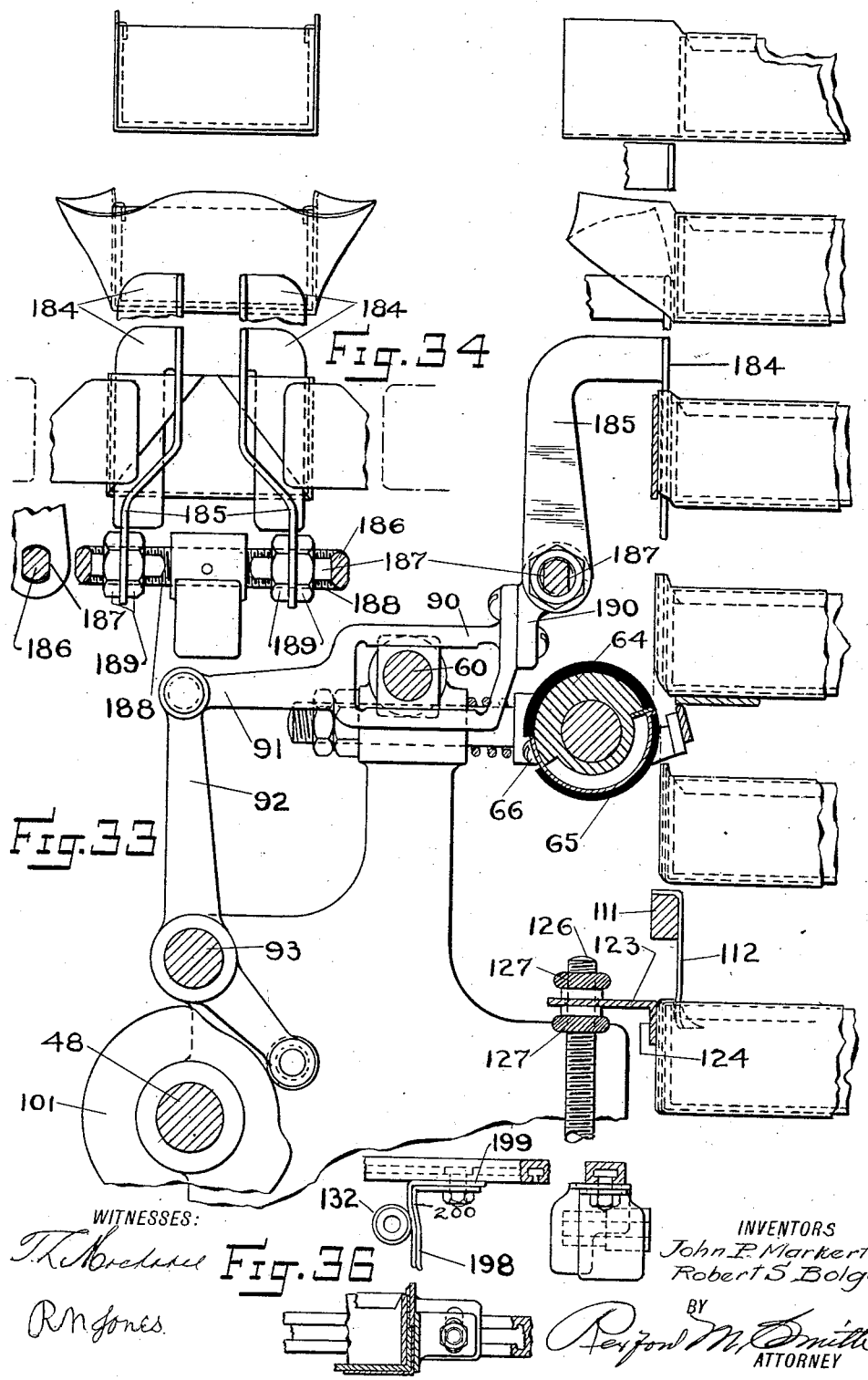

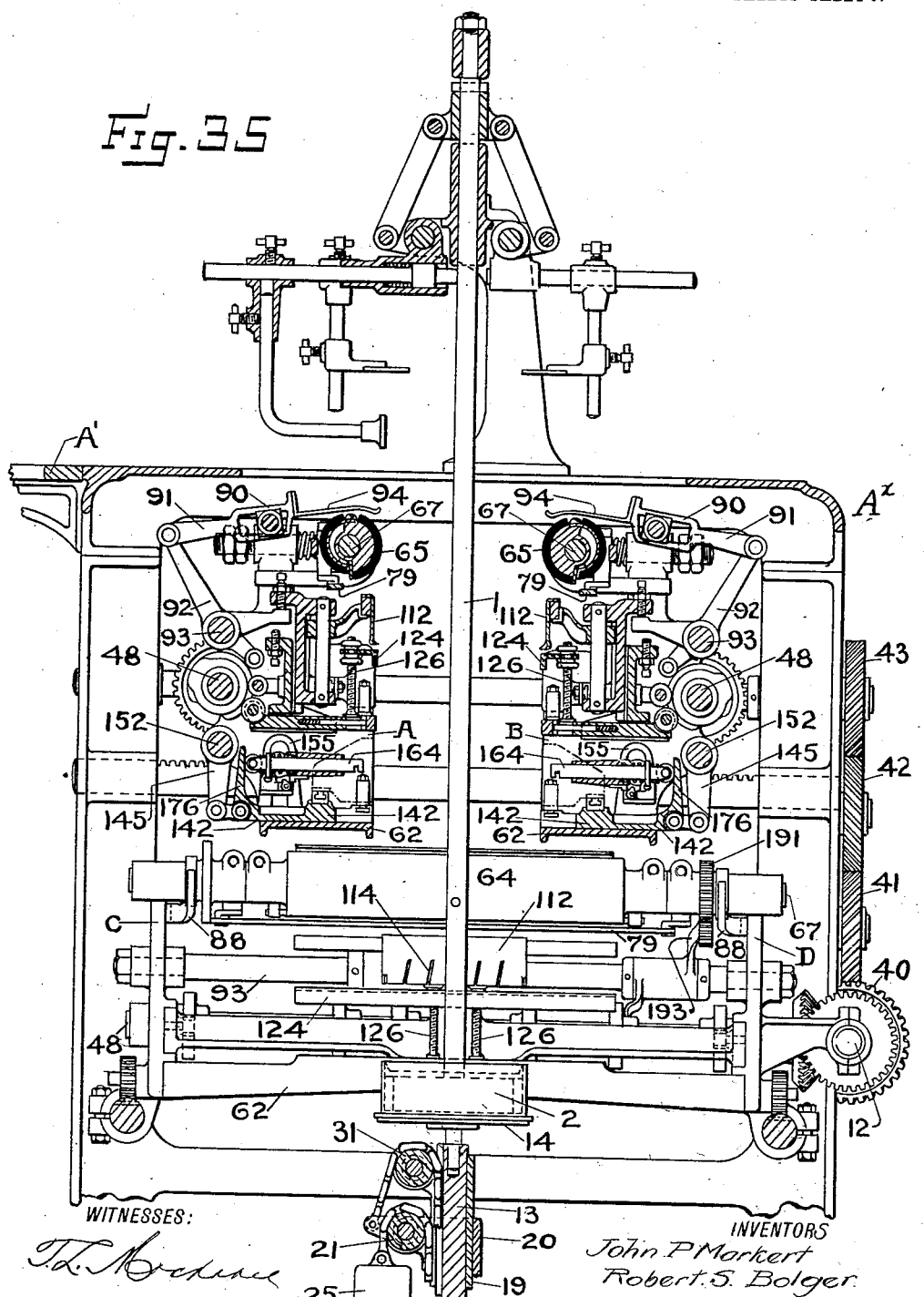

UNITED STATES PATENT OFFICE.

JOHN P. MARKERT, OF BROOKLYN, AND ROBERT S. BOLGER, OF MORRIS PARK, NEW YORK; SAID BOLGER ASSIGNOR TO SAID MARKERT.

BOX-COVERING MACHINE.

1,065,153.             Specification of Letters Patent.      Patented June 17, 1913.

Application filed August 28, 1909. Serial No. 515,119.

*To all whom it may concern:*

Be it known that we, JOHN P. MARKERT, a citizen of the United States, residing at Brooklyn, Kings county, New York State, and ROBERT S. BOLGER, a citizen of the United States, residing at Morris Park, in the county of Queens and State of New York, have invented a certain new and useful Box-Covering Machine, of which the following is a specification, reference being had therein to the accompanying drawing.

This invention relates to box covering machines, and is in the nature of a carrying forward of the construction shown and described in our prior application Ser. No. 464,899, filed November 28, 1908, the object of the invention being to simplify and improve the construction disclosed in said prior application and render the operation of the machine, as a whole, more reliable.

A further object of the invention is to provide a special arrangement of transmission gearing for imparting motion from the driving shaft of one set of units to the driving shaft of the other set of units, thereby doing away with the shaft and bevel gear drive disclosed in our said former application.

A further object of the invention is to provide a novel construction of presser roll including means for adjusting the depth of the shoulder of the presser roll to suit boxes having extension bottoms of varying projection, the adjusting means adapting said shoulder to be graduated to any degree and to be retained in such adjustment.

A further object of the invention is to provide simple and reliable actuating mechanism for the bottom plunger whereby the latter is caused to follow the movements of the top plunger and box with accuracy.

A further object of the invention is to provide a novel and reliable arrangement of tucker and turn-in mechanism for operating on the cover wrap as the box advances in its movement through the machine; also reliable means for automatically moving the presser roll out of the path of the box after said presser roll has performed its work on the cover of the box.

A further object of the invention is to provide reliable means for automatically actuating and tilting the thumb-holer and properly timing the same with relation to the movements of the box.

With the above and other objects in view, the nature of which will more fully appear as the description proceeds, the invention consists in the novel construction, combination and arrangement of parts as herein fully described, illustrated and claimed.

Figure 31:
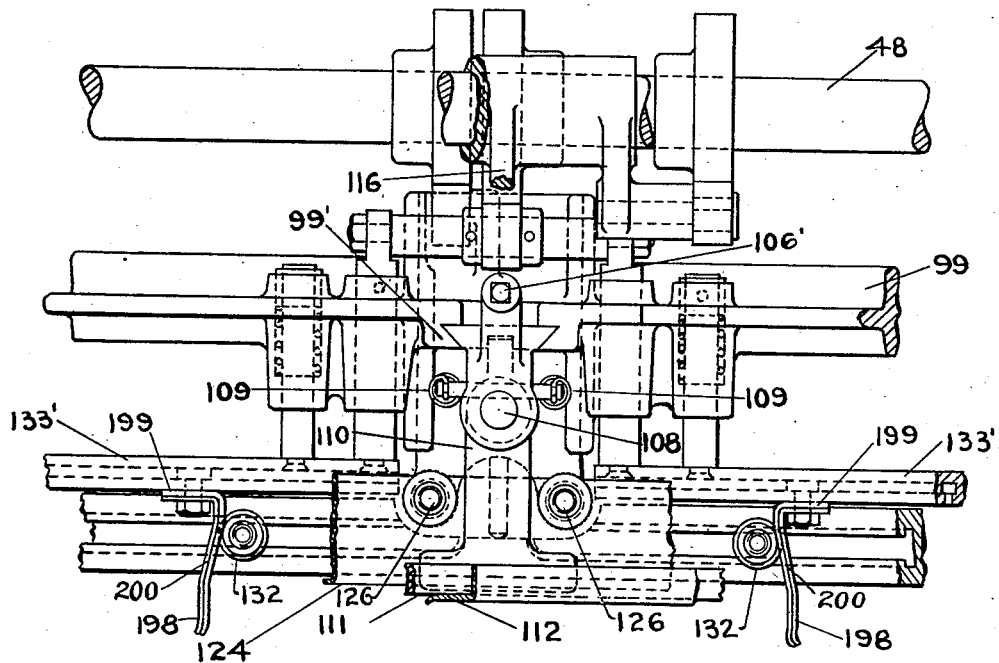
Figure 32:
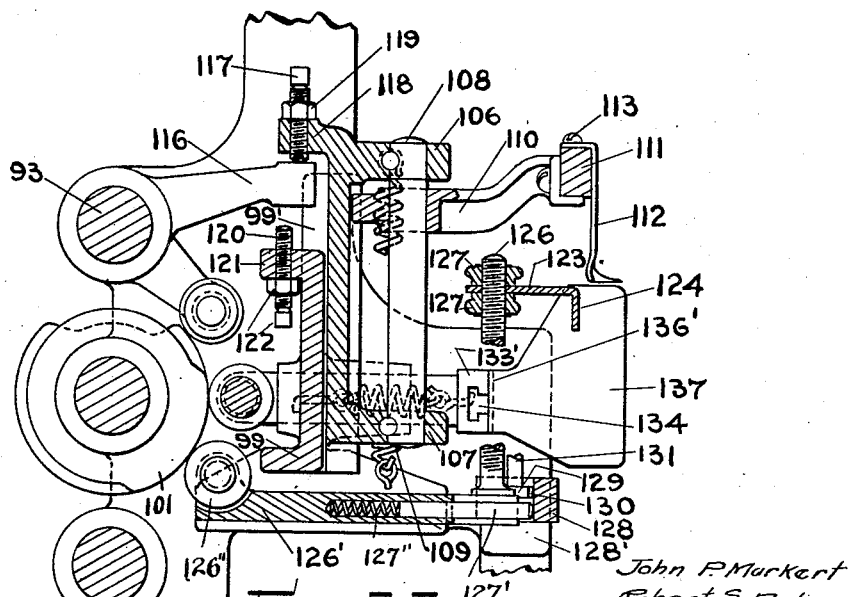

In the accompanying drawings: Figure 1 is a side elevation of the improved box covering machine looking toward the cam side thereof. Fig. 2 is a rear elevation of the machine. Fig. 3 is an enlarged front elevation of the bottom plunger, showing the weight and sprocket-controlling elements therefor. Fig. 4 is a side elevation of the same. Fig. 5 is a cross section on an enlarged scale, on the line E—F of Fig. 4. Fig. 6 is an elevation of one of the units looking toward the outer side thereof, showing the actuating cams for the several operative parts carried by the unit. Fig. 7 is a vertical cross section through a unit on the line A—B of Fig. 6. Fig. 8 is also a vertical section through a unit on the line C—D of Fig. 6. Fig. 9 is an outside elevation of part of a unit. Fig. 10 is a detail rear elevation of one of the presser plates for loose wrap boxes. Fig. 11 is a plan view, showing one of the end tuckers and the deflecting roller therefor and the parts with which said elements are connected. Fig. 12 is a detail front view of one of the presser rolls. Fig. 13 is a cross section through the same, on the line I—J of Fig. 12. Fig. 14 is a cross section on the line K—L of Fig. 12. Fig. 15 is a cross section on the line G—H of Fig. 12. Figs. 16, 17, 18, 19, 20 and 21 are diagrammatic views illustrating the operation of the presser roll and presser foot in connection with the platen and cover wrap at different stages in the relative movements of said parts. Fig. 22 is an enlarged detail vertical cross section through the lower portion of one of the units, showing the thumb-holer mechanism before the thumb-holer is acted upon by the presser foot. Fig. 23 is a similar section omitting parts of the actuating mechanism and showing the thumb-holer moved inward by the presser foot. Fig. 24 is a section taken at right angles to Fig. 22 on the line M—N. Figs. 25, 26, 27 and 28 are detail sections taken on the same line as Figs. 22 and 23, showing the thumb-holer in different stages of its operation. Fig. 29 is an edge view of one of the turn-in fingers. Fig. 30 is a fragmentary elevation of the same. Fig. 31 is a plan view on an enlarged scale of the central portion of one of the units. Fig. 32 is a vertical cross section through the same. Fig. 33 is a side view, on an enlarged scale, showing the presser roll and presser plate mechanism and the manner in which the boxes are operated on thereby. Fig. 34 is an outer face view of the upper portion of Fig. 33. Fig. 35 is a vertical sectional view of the machine illustrating the general arrangement of the mechanism. Fig. 36 is a detail view of one of the duplex end tucker fingers.

Referring to the drawings, $A^x$ designates the machine frame, the construction of which is designed with a view to supporting and providing for the bearing of the several operative elements of the machine hereinafter described, A' designating the operator's feed table at the front of the machine, the boxes and covers being placed upon said table and fed to the machine by the attendant. The machine is also designed with reference to the use of upper and lower sets of units, the upper set of units being designated A—B and the lower set of units C—D.

Before the description of the units, however, the plunger mechanism will be described as follows: The top plunger 1 is arranged and actuated in the same manner as described in my prior application above referred to. In other words, the top plunger 1 which is provided at its lower end with a plunger block 2, is connected at its upper end to a plunger arm 3 which extends inward from one side of the machine where it is connected to a rack bar 4 operatively connected by multiplying gears 5 and 6 with a second vertically reciprocating rack bar 6' carried by a guide rod 7 which is connected by a pitman 8 to a cam lever 9 fulcrumed at 10 and actuated by a cam 11 at one side of the machine, the said cam being mounted on the lower unit driving shaft 12 to be hereinafter more particularly described. The bottom plunger 13 is best illustrated in Figs. 3, 4 and 5 and is provided at its upper end with a box supporting platen 14 mounted on a base plate 15 provided with a shank or stem 16 which is let into the upper split end of the plunger 13, as shown in Fig. 4, wherein it is held by means of a clamping screw or bolt 17 and prevented from turning by means of a pin or key 18. The bottom plunger comprises the upper and inner section 13, an adjacent tubular telescopic section 19, and a lower stationary housing section 20. It will be noted that the section 13 is adapted to slide or telescope within the section 19 and the latter is also adapted to slide or telescope within the stationary section 20, thereby enabling the platen 14 to be carried downward to the necessary extent and also to be elevated to the required point. In connection with the stationary section 20, we employ upper and lower sprocket wheels 21 and 22, respectively, around which runs a sprocket chain 23 which is attached at a low down point 24 to the plunger section 19 while, at another point, the chain 23 has connected thereto a traveling counterbalance weight 25 which is sufficient to extend or protract the bottom plunger to its full extent. The upper sprocket wheel 21 is mounted on a shaft 26 supported by a bracket 27. Connected to this same bracket is a threaded eye-bolt 28 which is adjustable in the bracket 27 by means of a nut 29 whereby the adjustment of a second sprocket chain 30 may be effected. This sprocket chain 30 extends upward over and around a sprocket wheel 31 on a bracket or laterally extending arm 32 on the intermediate plunger section 19 and thence downward where it connects at the point 33 to the plunger section 13. By reference to Fig. 5, it will be observed that the plunger sections are preferably rectangular in cross section and nested one within the other so as to freely telescope. It will further be noted that the inner or top section 13 is provided in one side with a channel 34 in which the chain 30 is received so as to be within the plane of the outer confines of the section 13 and not interfere with the telescopic action of the plunger sections. In the same manner, the section 19 is channeled in one side as shown at 35 to receive the chain 23 in the same manner as above described in connection with the chain 30.

In view of the fact that the chain 30 is attached to a fixed point, namely, the bracket or arm 27, as the plunger section 19 is carried upward by the descent of the weight 25, the sprocket wheel 31 is correspondingly elevated and thereby acts on the chain 30 to raise the end which is attached at the point 33 to the inner or top section 13 of the plunger. Therefore, the sections 19 and 13 of the plunger are simultaneously elevated at different rates of speed. In the descent of the platen 14 with the box thereon, the operation of the sprocket and weight mechanism hereinabove described is reversed. The weight 25 is sufficient to sustain the platen 14 at its highest point of movement and is also sufficient to move the platen from the lowest point to the highest point when relieved of the pressure of the top plunger. 35' designates a spring attached to the bottom of the weight 25 and serving when it comes in contact with the base of the frame to limit the upward movement of the bottom plunger. This will act as a stop to the travel of the plunger and admit of the platen always remaining in line with the feed board which is the maximum height, the bottom platen is intended to travel.

36 designates the driving pulley of the machine on the shaft 37 of which is mounted a spur gear wheel 38 which meshes with a similar wheel 39 on the shaft 12 which carries the cam 11 above referred to. On the same shaft 12 is mounted a spiral gear 40 which actuates a train of other spiral gears 41, 42 and 43, the last-named gear being mounted fast on the upper unit drive shaft 44, which, it will be observed, extends at right angles to the shaft 12, both of said shafts being arranged upon the outside of the machine frame. The shaft 12 has slidingly mounted thereon bevel gears 45 and 46 having a splined engagement with the shaft 12 so that they may be moved inward and outward when the unit frames C—D are adjusted toward and away from the center of the machine to accommodate boxes of different sizes. The gear 45 meshes with the gear 47 on the cam shaft 48 of the unit C, while the gear wheel 46 meshes with a corresponding wheel 49 on the same shaft 50 of the unit D. In like manner the upper unit shaft 44 is provided with splined and sliding bevel gears 51 and 52 which mesh with corresponding wheels 53 and 54 on the cam shafts 55 and 56 of the upper units A—B which are also adjustable toward and away from each other so as to enable the machine to operate upon boxes of different sizes.

57 designates the starting treadle and 58 the connecting rod which extends to a pivoted and swinging clutch lever 59 which acts to clutch and release an element of the driving mechanism to enable the machine to be started as soon as a box has been placed in proper relation to the plunger.

Each unit comprises a pair of end frames, as shown in Fig. 6, which end frames are connected at various points by suitable tie bars 60, 62 and 93, the second-named tie bar being in the form of a plate for supporting the thumb-holer and other mechanism, said plate being flanged and rabbeted at its opposite ends 63 and bolted or otherwise secured to the two end members of the unit frame, as clearly shown in Fig. 6. The said end members of the frame are also connected by the cam shaft 48 which is mounted at its opposite ends in bearings in the unit frame.

At the top of each unit frame there is a presser roll 64 which is shown in Fig. 6 and illustrated in detail in Figs. 12 to 15 inclusive. The presser rolls are arranged in two sets, one set at a right angle to the other set and the rolls of each set being parallel to each other and located so as to operate on opposite sides of the box, so that all four sides of the box are operated on by said rolls in the passage of the box through the machine. Each presser roll comprises a solid or unyielding main body or section to which the numeral 64 is applied and a yielding or spring section 65 which is fastened to the main section along one edge, as shown at 66 by means of screws or other suitable fastening devices. Both the yielding and unyielding portion of the presser roll operate to press the cover wrap against the box and the presser roll, as a whole, is clamped upon the presser roll shaft 67 by clamping screws or bolts 68, thereby enabling the presser roll to be adjusted both longitudinally and circumferentially of its shaft. On the inner face of the free edge of the spring section 65 there is a bar or strip 69 to which are connected the outer ends of adjusting bolts 70, the latter extending through lugs 71 on the main section of the presser roll and receiving nuts 72 by means of which the free edge of the flexible section 65 may be drawn inward from the main body or section of the roll or allowed to move outward for the purpose of varying the depth of the shoulder 73 which, as illustrated in the diagrammatic views, Figs. 16 to 21 inclusive, is used for deflecting the cover wrap 74 around the extension bottom 75 of the box being covered.

The object of having a section of the presser roll yielding is to permit same to automatically vary the depth of the shoulder when operating on shoulder neck boxes. Normally the shoulder of the roller is less in depth than the thickness of the cardboard representing the lower part of box surrounding or housing the neck. This thus permits the shoulder of the presser roller to adjust itself automatically to any varying thickness of the outer section of box operated on and also permits the unyielding section of roller to contact with and press the covering paper to the neck section of the box securely regardless of any variation in the material referred to. It also follows that as the shoulder of presser roller meshes with the shoulder of the box and the flexible section is depressed that the flexible part of the roll which has already operated on the covering wrap, must give to admit of the depression at the point of the shoulder. This causes the flexible section to change its arc a trifle, but serves the purpose for which the same is employed.

The adjustment for varying the depth of the shoulder of the presser roll to any given depth is used only for operating on extension edge boxes, when it is desirable to have the depth of shoulder constant according to the depth of extension beyond the box side of the box operated on. It will also be noted that the flexible section of the roll contacts with the box extension at the very edge of the flexible section only.

In order to provide for accelerating the rotary movement and surface speed of the presser roll as compared with the speed of rectilinear movement of the box in its passage through the machine to adapt the machine to be used on extension edge boxes, the presser roll is provided with shaft hangers 76 extending transversely beneath the same as shown in Figs. 13 and 14; and in said shaft hangers are mounted rock shafts 77. At one end each rock shaft is provided with a short crank arm 78 to which is connected a presser bar 79 which lies in the path of movement of the box platen 14 and is adapted to be depressed thereby, as shown in Figs. 17 and 19 inclusive. At one end, a rock shaft 77 is provided with another crank arm 80 carrying at its end a roller 81 which moves in contact with an arcuate cam 82 supported by an arm or bracket 83 fast upon the upper tie rod 60 of the unit held at any desired point of adjustment by means of a set screw 84. The roller 81 is constantly held in contact with the cam 82 by means of a coiled spring 85 which encircles the shaft 77 and has one end in engagement with the crank arm 80 while the other end is in engagement with the shaft hanger 76, as clearly shown in Fig. 14. It will readily be seen as the cam roll runs on the arcuate cam the rock shaft is lifted and in doing so throws downward the crank hangers 76 to which the presser roll is attached and thereby increases the surface speed of the roller to produce the desired effect of compensating for the difference in speed of the rectilinear travel of box as compared with the surface speed of the presser roll. The accelerated movement of the roller is to compensate for the difference in the straight line travel of the box as compared with the arc of the presser roll. It will be noted that the presser roll foot contacts with the bottom box plunger platen and as this device travels in a larger arc than the diameter of the presser it follows that the presser foot must either travel away from the platen or some means must be employed for accelerating the travel of the roller and this is accomplished by the rock shaft operating in conjunction with the arcuate cam. This cam accelerates the roller only up to the time that the shoulder of the roller has carried the cover wrap down against the upper side of the extension edge of the box. After reaching that point the cam has no further action on the rock shaft and the roller travels by reason of its contact with the box side.

86 designates a tie bar or yoke which connects the two shaft hangers 76, as shown in Fig. 12, thus causing both shaft hangers and rock shafts to swing simultaneously and equally.

86' represents a disk that acts as a stop for the presser bar 79 when the same has been carried to the lowest position through the medium of the spring 85. On each presser roll there are mounted offsetting cams 87 which, in the rotation of the presser roll, come in contact with deflecting hooks 88 secured to the unit frame, as shown at 89 in Fig. 7. The coöperation between the cams 87 and offsetting elements 88 occurs just after the box has moved past the presser roll, whereby the roll is moved laterally out of the way to prevent its interference with the box in the return movement of the latter.

Mounted to reciprocate horizontally on the upper tie rod 60 is a sliding head 90 having an arm 91 which is connected to a crank arm 92 on a rock shaft 93 extending along the back of the unit, as best shown in Fig. 8. The sliding head 90 has connected thereto a projecting guard plate 94 of a width equal to the full length or width of the box to be covered and which is detachable from the head by means of one or more screws or equivalent fasteners 95. The outer extremity of the guard plate is hooked in an upward direction as shown at 96 so as to engage the cover wrap 74 in the manner illustrated in Figs. 16 to 20, inclusive, so as to prevent the gummed side of the cover wrap from smearing the adhesive material on the adjacent parts of the machine as the box descends and is acted upon by the presser roll 64. The sliding head 90 acts at the proper time to thrust the guard plate inward and withdraw the same out of the way in accordance with the movement of the box.

The end members of the unit frame are provided with parallel horizontal guides or cleats 97, as shown in Fig. 7 between which reciprocate slides 98, said slides being connected by an integral connecting cross bar 99 of inverted T-shape, as shown in Figs. 7 and 8, also Figs. 31 and 32 whereby both slides 98 are caused to move simultaneously. Each slide 98 is further provided with a roller 100 which is acted upon by a cam 101 on the cam shaft 48, above referred to. The cams 101 operate on the rollers 100 to thrust the slides 98 inward. The slides are again moved outward after the cam has ceased to operate on the roller 100 by means of springs 102 which embrace tension rods 103 connected at their inner ends to the slides, as shown at 104. The rods 103 pass through openings in bridge pieces 105 connecting the guides 97, as shown in Fig. 7 and the said tension device is adjustable by means of one or more nuts 106 threaded upon the inner ends of the rods 103. The tension devices above referred to may be regulated by means of the nuts 106 and serve to hold the rollers 100 always in contact with the working faces of the cams 101.

Extending upward from the bar 99 and integral therewith are two upright guides 99' which serve to guide the up and down movements of a slide, carrying lugs 106', 107 and 118. The lugs 106' and 107 have permanently located on them a vertical rod 108. The downward motion of the slide is controlled by springs 109. The springs are always under tension and fastened at the bottom to an eye attached permanently and at the top to the pin which passes through lug 106' and moves with the same. The slide is held normally in its upper position with the springs expanded by the lever 116 bearing against a set screw 117, which set screw also acts to adjust the height of the turn-in finger when the latter has not been adjusted to its exact height on rod 108.

Adjustably mounted on the rod 108 is a turn-in finger arm 110 and to the outer end thereof is connected a bar 111 while to the bar is secured a turn-in and wipe on finger 112, the same being detachably connected to the bar by means of screws or like fasteners 113. Each unit is provided with a turn-in finger and by reference to Fig. 30, it will be seen that said turn-in finger is in the form of a plate or spring holder which is rendered more flexible by providing the same with slits 114 extending from the bottom edge upward, said slits being inclined or disposed obliquely so that as the turn-in finger pushes the upper edge of the cover wrap downward into the box and presses the same against the inner surface of the box, the slits 114 will not have the effect of forming creases in the cover wrap but will press the same smoothly and evenly against the box. At its lower corners, the turn-in finger 112 is provided with triangular-shaped cutting nibs 115, the upper edges of which are on an incline and sharpened, as shown in Figs. 29 and 30, the said cutting nibs operating to slit the flap portions of the cover wrap which fold over the top edge within the corners of the box and thereby permitting the paper to be turned in without creasing or overlapping, thus forming a neat application of the cover wrap to the box in the several internal corners or angles thereof. The cutting action of these nibs is intended to take place at the top edge of the box, there being sufficient resistance at this particular point to admit of the point of the cutting nib penetrating the paper and when the point has once entered the paper the angle edge of cutting device will readily separate or spread the balance of the paper which usually does not exceed a height of three-eighths of an inch. During this operating the paper is supported by the box. The turn-in fingers are moved upward by means of a crank arm 116 on the shaft 93 as shown in Figs. 8 and 32 the throw of the turn-in fingers being adjustable by the set screws 117 and limited by means of the set screws 120 passing through the lugs 121 on the guides 99. The screw 117 is made fast by means of a lock nut 119, as shown in Figs. 8 and 32. The downward movement of the turn-in finger is limited by the arm 116 coming against another screw 120 passing through a lug 121 connected with the bar 99 and the adjustment of the screw 120 is maintained by means of a lock nut 122.

In connection with each turn-in finger 112, we employ a reciprocatory pressure resisting plate 123 having a working face 124. This plate 123 is adjustable up and down upon threaded stems 126 to suit boxes of different heights or depths, adjusting and holding nuts 127 being threaded upon the stem 126 at opposite sides of the horizontal portion of the pressure resisting plate 123, as shown in Figs. 8 and 32. The stems 126 are fastened to the plate 126' which latter moves in guideways in the lower center or middle section of the cross member 99. The horizontal plunger rod 127' has its inner end constantly in engagement with the fixed cross member 128 and its opposite end in contact with springs 127''. The plate 126' is moved inward by a cam 101' and cam roll 126'' as indicated in Fig. 32 and as the cam acts on the cam roller and reciprocates the plate inward, the latter carries the stems 126 on which the pressure resisting plate is mounted inward toward the box side. In doing this the spring or springs 127'' are contracted and as the cam roll again travels upon a lower point on the cam the spring or springs serve to return the plate 126' to its outward position away from the box side.

The rail 128 which is stationary and connected to the unit frame at lugs 128' is provided in its upper side with an inverted T-shaped groove 129 in which is slidingly fitted the heads 130 of spindles 131 in which are journaled deflecting rollers 132, best illustrated in Figs. 8 and 31. Mounted adjacent to the bar 128 and above the same is a movable tucker carrying bar 133' which is provided on its inner side with a T-shaped groove 134 adapted to slidingly receive the heads at the lower ends of clamping bolts. Upon the bolts are mounted the bases 136' of the upper end tuckers 137 one of which is shown in Figs. 8 and 32. The extremities of these tucker fingers are curved or deflected in the form of an outturned hook, the same as are the lower end tucker fingers 140 at 138, Fig. 11, while a portion of the fingers between the extremities thereof is disposed at an angle or obliquely, as shown at 139, so that as the tucker finger is moved inward to tuck the cover wrap around the corner of the box 125, as shown in Fig. 11, the oblique portion 139 of the tucker finger strikes against the adjacent roller 132 and moves the end 138 of the tucker finger out of contact with the cover wrap and box, after the tucking operation has been completed. The slotted bar 133' permits the tucker finger to be adjusted laterally according to the size of the box by setting the bolts at any desired point in the groove 134. Each bolt is provided with a clamping nut.

In addition to the end tuckers just hereinabove described, an additional set of lower end tuckers 140 are employed for use in connection with loose wrap boxes, the same being illustrated in Figs. 8 and 11. These lower end tuckers are mounted adjustably by means of bolts 141 in the slotted bars 141' on a sliding plate 142 mounted upon the connecting bottom plate 62 above described and the said lower end tuckers also coöperate with and are deflected away from the box by rollers 132' and are adjustable in a groove 144 in the bottom plate 62, as shown in Figs. 8 and 11 said rollers being held in place by nuts 135. The plate 142 is reciprocated inward and outward by means of a thumb-holer crank arm 145, said arm being connected by a link 146 with the plate 142, as shown in Fig. 8. The plate 142 is moved in the opposite or outward direction by means of a contractile spring 147 one end of which is attached to a lug 148 on the bottom plate 62, while the other extremity is connected to the lower end of a pin 149 extending from the plate 142 downward through a slot 150 in the plate 62, as shown in Fig. 8. The upper set of end tuckers are intended for use on tight wrapped boxes only and in consequence their travel against the box ends is always constant. The lower set are for all styles of loose wrap boxes and the end tuckers are adjustable to admit of a greater or lesser travel according to the size of the box operated on and the style of fold to the wrapper on the end of the box. The slotted base 136 which forms a support for the tucker finger 140 permits the tucker finger to be adjusted inward and outward to give the proper limits of movement thereto and said base is locked in position by the bolts 141 in the slots 143 clamped by the nut 149'.

The arm 145 above referred to forms part of an elbow lever embodying a sleeve or hub 151 which is mounted to turn upon a cross shaft 152 of the unit, the other arm 153 of said lever being operated by a cam 154 on the shaft 48 for imparting motion to the sliding plate 142.

The thumb-holer is mounted to operate between a pair of standards 155 which are slotted, as shown at 156 to allow the thumb-holer to be adjusted up and down to suit boxes of different heights. The standards 155 extend upward from the plate 62 and are preferably formed integrally therewith. The thumb-holer comprises a tubular housing 157 which is mounted to tilt on a horizontal axis on end pintles or journals 158 which are adjustable up and down in the slots 156 and adapted to be held at any desired point of adjustment by clamping bolts 159, as shown in Fig. 24. At each side, the housing 157 is provided with shoulders 160 which coöperate with other shoulders 161 on adjustable boxes or slides 162 carried and locked in position by the bolts 159 and journals 158, the said shoulders serving by coming in contact with each other to sustain the housing 157 in a substantially horizontal working position as in Fig. 23, while admitting of an upward tilting movement as illustrated in Fig. 26. Springs 163 connected at one end to the housing 157 and at the other end to the boxes 162 serve to maintain the thumb-holer in a normally horizontal position, as illustrated in Figs. 22 and 23.

Mounted slidingly within the housing 157 is a tube 164 provided near its inner end and in its lower side with a notch or slot 165 adapted to receive the top edge of the box in the manner illustrated in Figs. 23, 27 and 28. The tube 164 is also provided with a circumferential flange or head 166 against which bears the outer end of a coil spring 167 the opposite end of which is received in a recess 168 within the adjacent end of the housing 157. Mounted to slide within the tube 164 is a cutter 169 in the form of a plunger having a conical recess 170 in its inner end thereby forming an annular cutting edge which operates across the slot or notch 165 to punch out and remove a section 171 of the side of the box, as illustrated in Fig. 28, thereby forming the thumb hole of the box. At its inner end, the cutter has a coiled spring 172 encircling it and bearing at one end against the flange or head 166, the outer end of the spring bearing against a pin 173 extending transversely through the corresponding end of the cutter 169. The pin 173 forms a journal for a roller 174 which is operated upon by a pusher foot 175 extending upward from the plate 142 so that as said plate 142 is moved inward, the pusher foot 175 acts on the roller 174 and imparts the necessary thrust to the cutter 169 for the purpose described.

In order to provide for tilting the thumb-holer to carry the notch 165 over the box edge, a shoe 176 is secured to the bottom of the housing 157 as shown at 177 and said shoe coöperates with the projecting lip of a cam 178 journaled on a stud 179 on a sliding member 180 arranged in a suitable guide 181 beneath the housing 157 and secured to the housing 157 through arms 181'. The cam 178 is normally held with the lip thereof projecting upward by means of a return spring 182 which returns the cam to its normal position shown in Figs. 22 and 23, after it has been deflected by the shoe 176. In the operative stroke of the thumb-holer, the cam 178 rides against the shoe 176 and thereby causes an upward tilting movement of the thumb-holer, as indicated in Fig. 26, while in the return movement of the thumb-holer, the cam recedes to allow the housing 157 to return to its initial point of movement. The sliding member 180 is provided on its upper side with spaced lugs or fingers 183 which embrace the flange 166 above referred to whereby said sliding member 180 is actuated by and simultaneously with the tube 164.

In connection with regular and inverted loose wrap boxes, we provide presser plates 184 shown in Figs. 9, 10, 33 and 34, said plates being adapted to bear against the cover wrap and hold the same in close contact with the box. Each presser plate embodies an L-shaped shank 185 which is formed with a hole at its lower end to receive a stem 186 having its opposite sides flattened as shown at 187, said stem being threaded, as shown at 188 to receive nuts 189 arranged at opposite sides of the shanks 185, as shown in Figs. 10 and 34, thereby enabling the presser plates 184 to be adjusted lengthwise of the stem to suit the size of the box being operated upon there being two presser plates on the stem 186. The stem 186 is fastened to a bracket 190 and the latter is adapted to be secured to the sliding head 90, above described for use as stated on regular and inverted loose wrap boxes. Two of these plates are used in accomplishing the purpose for which they are provided. One plate is adjustable to the right and the other to the left of the head 190. These plates are used only for loose wrap boxes and in the case of wrapping "inverted end fold" boxes, said plates are made longer than those used on regular fold end boxes. In the former case they wipe the paper projecting beyond the end of the box up against the plane surface of box and immediately the lower set of end tuckers on the upper set of units wipe in the flap ends produced by the action of plates on the wrapper and the box, in its movement to the lower set of units, disengages the presser plates by passing down through the folded wrappers. The box then passes into the lower unit presser rollers and immediately after passing same is acted upon by the tuck in fingers and complete the attaching of the end flaps to the inside of the box. In the case of wrapping regular end fold boxes the presser plates are not as tall as those referred to in the preceding description and are so designed that the end tuckers first act in wiping in the side flaps of the projecting end of cover wrapper and the presser plates then contact the remaining end of cover wrap and fold the same up against the plane surface of the box end. The box then passes to the lower set of units to be completed in the manner described in preceding case. The presser plates are actuated by the lower guard plate reciprocating head as explained. The plunger with completed box then returns to the next operative position.

The presser roll 64 above described is revolved by means of a pinion 191 fast on the end of the presser roll and meshing with a sector 192 carried by an arm 193 extending outward from a sleeve or hub 194 journaled on the tie rod 93 of the unit frame, as shown in Fig. 6, said sleeve or hub having an arm 195 which is acted upon by cam 196 fast on the cam shaft 48. The sector 192 has an eccentric portion 197 of less diameter than the major portion thereof to permit the pinion 191 to recede in the offsetting movement of the presser roll hereinabove described.

In Fig. 31 is shown a duplex end tucker finger which is composed of two blades 198 of which the inner one has a slotted base 199 to admit of adjustment to the shoulder of the box operated on. This blade or finger is also made with an oblique portion 200 to be acted upon by the deflecting rollers, each of which latter has two faces of different diameters to act simultaneously on both fingers.

In the operation of machine, the machine is started with the foot treadle provided for the purpose and shown in the drawings. As the plunger with box and wrapper attached to bottom starts in its downward course, it comes in contact with the bottom plunger platen, which is normally even with the feed board C'. The guard plates then move outward to clear the box and plunger platens and in doing so carry with them the hanging sides of cover wrapper and prevent the glued side of same from coming in contact with the presser rolls. In the further progress of the plunger with the box, the bottom plunger platen comes in contact with the presser foot and causes the presser rolls to revolve and press the cover wrap against the box sides. After the box has passed the presser roll and reaches a point opposite the pressure resisting plates, the plunger stops and the latter move inward against the box side, but without offering any pressure against the same. At the same time as the pressure resisting plates move inward the upper set of end tuckers move inward also and wipe the end tabs against the box ends. Simultaneously the tuck in and wipe-on fingers move inward and fold the projecting top of wrapper over top edge of box side and wipe and press same against the box inside as the tuckers travel down inside of the box. As soon as these operations are completed, the pressure resisting plates move back from the box sides, the tucker and wipe-on fingers move inward to release all pressure to box inside and the end tuckers also move inward and are deflected from the box ends. The plunger then moves downward to the next set of end tuckers on upper set of units which are used only in folding in the ends of wrappers on the boxes covered with loose wrappers. The plunger then stops in its travel and the end tuckers operate on the cover wraps and at the same time the thumb-holers move inward being deflected over the box sides by the shoe 176, and then drop over the top edge of box and the cutter then cuts out the thumb-holes as explained. The end tuckers are then deflected with the deflecting rollers and the plunger proceeds to the lower set of units, while the thumb-holer retracts to its next operative position. In operating on tight wrap boxes the same process is gone through with on the bottom units as explained above omitting the end tuckers and thumb holers. In covering loose wrapped boxes, the guard plates are detached from the lower reciprocating head unit and the loose wrap end folding plates are substituted. When boxes operated on are of the loose wrap style, the upper set of end tuckers are thrown out of engagement and vice versa for tight wrap. Also the elements used for covering the box, in succession, retract to their next operative positions. In operating on tight wrap boxes, the presser rolls are preferably turned or adjusted so that the flexible section will not contact with the box, but the solid section only. The lower set of end tuckers are also thrown out of action by being moved out of the line of travel of the box operated on. The accelerating cam is not used on this style box. In covering shoulder boxes, the presser rolls for these boxes are preferably adjusted so that the flexible section of the roll operates on the lower section of the box and the unyielding section on the neck of the box. The duplex end tuckers are used on this style of box and these can be operated on either the upper or lower set of housings. The set of end tuckers not used are moved off the line of travel as stated in the preceding case. The accelerating cam is not used on this style of box. In operating on extension edge boxes, the presser rolls are adjusted so that the shoulder of the rolls will mesh with the top of the box extension as described above. The upper set of end tuckers is used on this style of box and the other set is thrown out of the line of travel of box. The accelerating cam is used only on this style of box. In loose wrapper boxes, the presser rolls are adjusted so that the unyielding section operates on the boxes only. The lower set of end tuckers is used for folding the ends of the wrapper and the other set is thrown out of the line of travel of the box. In covering boxes with regular end fold wrappers the lower set of end tuckers first fold in the wrap against the box ends and then the plates illustrated in Figs. 33 and 34 wipe the projecting ends of the wrap up against the plane surface of the box end to complete the fold of the wrapper before the box passes into the lower set of presser rolls and tuck in and wipe-on fingers. In operating on inverted fold end wrapped boxes the plates referred to above are made of a length to engage the ends of the box wrapper and wipe the same up against the plane surface of the box end before the end tucker fingers fold in the remaining parts of the wrapper and the box then passes to the lower set of presser rolls and tuck-in and wipe-on fingers.

We claim:—

1. A box covering machine comprising cover-affixing mechanism, and means for directing the box in a rectilinear path past the cover-affixing mechanism embodying a sectional telescopic plunger, a plunger-operating weight, and a plurality of flexible plunger-operating connections each operated by said weight, and attached to the plunger sections.

2. A box covering machine comprising cover-affixing mechanism, and means for directing the box in a rectilinear path past the cover-affixing mechanism embodying a sectional telescopic plunger, a weight-operated chain connected to one plunger section, and a wheel-actuated chain connected to the adjacent plunger section.

3. A box-covering machine comprising cover-affixing mechanism, and means for directing the box in a rectilinear path past the cover-affixing mechanism embodying a sectional telescopic plunger, a traveling plunger-operating weight, a flexible connection between said weight and one plunger section, a wheel on the last-named plunger section, and a flexible connection having one end attached to said plunger section and the other end attached to a fixed point.

4. A box-covering machine comprising cover-affixing mechanism, and means for directing the box in a rectilinear path past the cover-affixing mechanism embodying a sectional telescopic channeled plunger, a traveling weight, a chain working in a channel in one plunger section and connecting the weight to one of the telescopic sections, and a second chain working in a channel in another telescopic section and attached to one of the telescopic sections and also to a fixed point.

5. A box covering machine comprising cover-affixing mechanism, and means for directing the box in a rectilinear path past said mechanism embodying a sectional telescopic plunger consisting of a stationary section and a plurality of movable sections housing within the stationary section, and means for protracting the movable sections comprising a movable weight, a sprocket chain attached to one point to the weight and at another point to a movable plunger section, a second chain attached to the adjoining movable section and to a fixed point, and wheels for said chains, one of said wheels being carried by one of the movable sections.

6. A box covering machine comprising cover-affixing mechanism, and means for directing the box in a rectilinear path past said mechanism embodying a sectional telescopic plunger consisting of a stationary section and a plurality of movable sections housing within the stationary section, and means for protracting the movable sections comprising a traveling weight, a sprocket chain attached at one point to the weight and at another point to a movable plunger section, a second chain attached to the adjoining movable section and to a fixed point, wheels for said chains, one of said wheels being carried by one of the movable sections, and means for adjusting the throw of the second chain.

7. A box covering machine comprising plunger mechanism for directing the box in a rectilinear path, and cover-affixing mechanism embodying a unit frame, a presser roll supported by the unit frame, and a cam on said roll acting to move out of the path of the box.

8. A box covering machine comprising plunger mechanism for directing the box in a rectilinear path, and cover-affixing mechanism embodying a unit frame, a presser roll supported by the unit frame, a cam on said roll acting to move the roll away from the path of movement of the box and a fixed surface against which the cam operates.

9. A box covering machine comprising plunger mechanism for directing the box in a rectilinear path, and cover-affixing mechanism embodying a unit frame, reciprocatory turn-in and wipe-on fingers movable independently of the top plunger and supported by said frame and having a limited stroke in the direction of movement of the box, slides by which said fingers are carried, a cross bar connecting said slides, means for projecting and retracting said slides, and means for adjusting the throw of the slides to suit boxes of varying heights.

10. A box covering machine comprising plunger mechanism for directing the box in a rectilinear path, and cover affixing mechanism embodying a unit frame, reciprocatory turn-in and wipe-on fingers movable independently of the top plunger and having a limited stroke in the direction of the movement of the box, slides by which said fingers are carried, a cross bar connecting said slides, means for adjusting the unit frame to accommodate boxes of different sizes and means for projecting and retracting said slides at a right angle to the movement of the box embodying a spring controlled tension device.

11. A box covering machine comprising plunger mechanism for directing the box in a rectilinear path, and cover affixing mechanism embodying a unit frame, reciprocatory turn-in and wipe-on fingers movable independently of the top plunger and having a limited stroke in the direction of movement of the box, slides by which said fingers are carried, a cross bar connecting said slides, means for adjusting the unit frame to suit boxes of different sizes and means for projecting and retracting said slides at a right angle to the direction of the movement of the box embodying a spring controlled adjustable tension device.

12. A box covering machine comprising plunger mechanism for directing the box in a rectilinear path, and cover-affixing mechanism embodying a unit frame, reciprocatory turn-in and wipe-on fingers movable independently of the plunger and having a limited stroke in the direction of movement of the box, slides by which said fingers are carried movable at a right angle to the direction of movement of the box, a cross bar connecting said slides, guides between which the slides work, bridge pieces connecting said guides, and spring tension devices connecting said slides and bridge pieces.

13. A box covering machine comprising plunger mechanism for directing the box in a rectilinear path, and cover-affixing mechanism embodying a unit frame, reciprocatory turn-in and wipe-on fingers movable independently of the plunger and having a limited stroke in the direction of movement of the box, slides by which said fingers are carried movable at a right angle to the direction of movement of the box, a cross bar connecting said slides, cams for operating said slides, cam-operated rollers on the slides, and retracting means for said slides.

14. A box covering machine comprising plunger mechanism for directing the box in a rectilinear path, and cover-affixing mechanism embodying a unit frame, a presser roll, a sliding guard supported by the unit frame, a sliding head on the unit frame above said roll by which the guard is carried, and a swinging crank arm on the unit frame connected with said sliding head for imparting motion to the latter.

15. A box covering machine comprising plunger mechanism for directing the box in a rectilinear path, and cover-affixing mechanism embodying a unit frame, a sliding head supported by said unit frame for the purpose specified, guiding means for said head, and a swinging crank arm on the unit frame operatively connected with said head.

16. A box covering machine comprising plunger mechanism for directing the box in a rectilinear path, and cover-affixing mechanism embodying a unit frame, a sliding head on said unit frame for the purpose specified, guiding means for said head, a swinging crank arm on the unit frame operatively connected with said head, and means on the unit frame for regulating the throw of said crank arm and sliding head.

17. A box covering machine comprising plunger mechanism for directing the box in a rectilinear path, and cover-affixing mechanism embodying a unit frame, a turn-in and wipe-on finger supported by the unit frame and movable at a right angle to the movement of the box and also having a limited stroke in the direction of movement of the box, and means for reciprocating said finger independently of the top plunger.

18. A box covering machine comprising plunger mechanism for directing the box in a rectilinear path, and cover affixing mechanism embodying a unit frame, a turn-in and wipe-on finger movable independently of the top plunger and supported by the unit frame and slidable at a right angle to the movement of the box, a slide rod by which said finger is carried, a crank arm for moving said slide rod lengthwise in a plane parallel to the movement of the box, and means for moving said slide rod lengthwise in the opposite direction.

19. A box covering machine comprising plunger mechanism for directing the box in a rectilinear path, and cover-affixing mechanism embodying a unit frame, a turn-in and wipe-on finger movable independently of the top plunger and supported by the unit frame and slidable at a right angle to the direction of movement of the box, a slide rod by which said finger is carried, a crank arm for moving said slide rod lengthwise in a plane parallel to the direction of movement of the box, and a spring for moving said rod lengthwise in the opposite direction.

20. A box covering machine comprising plunger mechanism for directing the box in a rectilinear path, and cover-affixing mechanism embodying a unit frame, a turn-in and wipe-on finger, movable independently of the top plunger and supported by the unit frame and slidable at a right angle to the direction of movement of the box, a slide rod movable in a plane parallel to the direction of movement of the box, a finger-carrying arm adjustable on said slide rod, and means for reciprocating said slide rod lengthwise.

21. A box covering machine comprising plunger mechanism for directing the box in a rectilinear path, and cover-affixing mechanism embodying a unit frame, a turn-in and wipe-on finger movable independently of the top plunger and supported by the unit frame and slidable at a right angle to the direction of movement of the box, means for moving said finger in the direction of movement of the box, and means for limiting the wiping-on-movement of said finger.

22. A box covering machine comprising plunger mechanism for directing the box in a rectilinear path, and cover-affixing mechanism embodying a unit frame, a turn-in and wipe-on finger movable independently of the top plunger, and a pressure resisting plate, and means for moving the turn-in finger in a plane parallel to the direction of movement of the box and the inner face of the pressure resisting plate.

23. A box covering machine comprising plunger mechanism for directing the box in a rectilinear path, and cover-affixing mechanism embodying a unit frame, a turn-in and wipe on finger supported by the unit frame movable in the direction of movement of the box independently of the top plunger, a pressure resisting plate, and means for adjusting said pressure resisting plate in the direction of movement of the box for the purpose specified.

24. A box covering machine comprising plunger mechanism for directing the box in a rectilinear path, and cover-affixing mechanism embodying a unit frame, a turn-in and wipe on finger supported by the unit frame and movable independently of the top plunger, a reciprocatory pressure resisting plate movable at a right angle to the direction of movement of the box, and means for moving the turn-in finger in a plane parallel to the direction of movement of the box and the inner face of the pressure resisting plate.

25. A box covering machine comprising plunger mechanism for directing the box in a rectilinear path, and cover-affixing mechanism embodying a unit frame, and turn-in and wipe on fingers movable relatively to the unit frame and slit obliquely with reference to their direction of movement.

26. A box covering machine comprising plunger operating mechanism for directing the box in a rectilinear path, and cover-affixing mechanism embodying a unit frame, turn in and wipe on fingers mounted on said frame and provided with cutting nibs, and means for reciprocating said fingers.

27. A box covering machine comprising box-carrying means including upper and lower plungers, a cover-affixing mechanism consisting of tuck-in and wipe-on fingers operating at right angles to the movement of the box and also having a limited travel in the direction of movement of the box, and means for reciprocating said fingers independently of the upper plunger.

28. A box covering machine comprising a plunger mechanism for conducting the box to be covered, and a cover-affixing mechanism comprising a shiftable rail, end tuckers carried by the rail and adjustable toward and away from each other thereon, rollers adjustable toward and from each other for engaging the end tuckers for deflecting them out of contact with the ends of the cover flaps after such ends have been affixed to the box.

29. A box covering machine comprising plunger mechanism for directing the box in a rectilinear path, and cover-affixing mechanism comprising end tuckers, a grooved rail and tucker deflecting rollers having spindles adjustable in the grooves of said rail.

30. A box covering machine comprising plunger mechanism for directing the box in a rectilinear path, and cover-affixing mechanism embodying end tuckers, a rail having a groove, and spindles provided with heads held in said groove and adjustable lengthwise thereof and tucker deflecting rollers journaled on said spindles.

31. A box covering machine comprising plunger mechanism for directing the box in a rectilinear path, and cover-affixing mechanism embodying a unit frame, a sliding member on said frame, end tuckers carried by said sliding member, and a thumb-holer also mounted on and movable with said sliding member.

32. A box covering machine comprising mechanism for directing the box in a rectilinear path, and cover-affixing mechanism embodying a unit frame, a sliding member on said frame, end tuckers carried by said sliding member, and a vertically adjustable thumb-holer also carried by said sliding member.

33. A box covering machine comprising plunger mechanism for directing the box in a rectilinear path, and cover-affixing mechanism embodying a unit frame, a sliding member on said frame, end tuckers carried by said sliding member, and a tilting thumb-holer also mounted on and movable with said frame.

34. A box covering machine comprising plunger mechanism for directing the box in a rectilinear path, and cover-affixing mechanism embodying a unit frame, a sliding member, end tuckers carried by said sliding member on said frame, a tilting thumb-holer also carried by said sliding member and means for tilting said thumb-holer.

35. A box covering machine comprising plunger mechanism for directing the box in a rectilinear path, and cover-affixing mechanism embodying a unit frame, a sliding member on said frame, end tuckers carried by said sliding member, a tilting thumb-holer also carried by said sliding member, and a receding trip for tilting said thumb-holer.

36. A box covering machine comprising plunger mechanism for directing the box in a rectilinear path, and cover-affixing mechanism embodying a unit frame, a sliding member on said frame, end tuckers carried by said sliding member, a tilting thumb-holer also carried by said sliding member, and a spring-controlled trip for tilting said thumb-holer.

37. A box covering machine comprising plunger mechanism for directing the box in a rectilinear path, and cover-affixing mechanism embodying a unit frame, a sliding member on said frame, end tuckers carried by said sliding member, a tilting thumb-holer also carried by said sliding member, and means for yieldingly holding said thumb-holer in a position normally perpendicular to the path of movement of the box.

38. A box covering machine comprising plunger mechanism for directing the box in a rectilinear path, and cover-affixing mechanism embodying a unit frame, a sliding member on said frame, a cam operated bell-crank lever for actuating said sliding member, end tuckers carried by said sliding member, and a thumb-holer also carried by said sliding member.

39. A box covering machine comprising plunger mechanism for directing the box in a rectilinear path, and cover-affixing mechanism embodying a unit frame, a sliding member on said frame, end tuckers carried by said sliding member, and a thumb-holer also carried by said sliding member and embodying a slidable housing sleeve, a slotted tube movable in said housing, a shoulder on said tube, a cutter working in said tube, and springs bearing against opposite sides of said shoulder.

40. A box covering machine comprising plunger mechanism for directing the box in a rectilinear path, and cover-affixing mechanism embodying a unit frame, a sliding member on said frame, a presser foot on said sliding member, a thumb-holer carried by said sliding member and embodying a sliding cutter arranged for actuation by said presser foot, and end tuckers also carried by said sliding member.

41. A box covering machine comprising plunger mechanism for directing the box in a rectilinear path, and cover-affixing mechanism embodying a unit frame, a spring retracted sliding member on said frame, a thumb-holer carried by said sliding member and embodying a tubular housing, a sliding cutter in said housing, means for imparting a thrust to said sliding member in opposition to the tension of said spring for actuating said cutter, and end tuckers also carried by said sliding member.

42. A box covering machine comprising plunger mechanism for directing the box in a rectilinear path, and cover-affixing mechanism embodying a unit frame, a presser roll having a shouldered convex working face, and means for turning said roll and also sliding the same bodily while the roll is turning.

43. A box covering machine comprising plunger mechanism for directing the box in a rectilinear path, and cover-affixing mechanism embodying a unit frame, a presser roll having a shouldered convex working face, a pinion on said presser roll, and a sector meshing with said pinion and having an eccentric or bastard portion.

44. A box covering machine comprising plunger mechanism for directing the box in a rectilinear path, and cover-affixing mechanism embodying a unit frame, a presser roll having a shouldered convex working face, a pinion on said presser roll, a sector meshing with said pinion and having an eccentric or bastard portion, and means for shifting the presser roll laterally and maintaining the pinion thereof in mesh with said sector.

45. A box covering machine comprising plunger mechanism for directing the box in a rectilinear path, and cover-affixing mechanism embodying a presser roll having a convex presser face embodying a flexible arcuate section, and means for adjusting said flexible section, to form a shoulder of variable depth.

46. A box covering machine comprising plunger mechanism for directing the box in a rectilinear path, and cover-affixing mechanism embodying a presser roll having a convex presser face embodying a flexible arcuate section, and means for contracting said flexible section to form a shoulder of variable depth, said means consisting of threaded adjusting members.

47. A box covering machine comprising plunger mechanism for directing the box in a rectilinear path, and cover-affixing mechanism embodying a presser roll having a shouldered convex working face, and a platen-controlled element for regulating the speed of rotation of said roll.

48. A box covering machine comprising plunger mechanism for directing the box in a rectilinear path, and cover-affixing mechanism embodying a presser roll having a shouldered convex working face, and a platen-controlled presser bar and connections for regulating the speed of rotation of said roll.

49. A box covering machine comprising plunger mechanism for directing the box in a rectilinear path, and cover-affixing mechanism embodying a presser roll having a shouldered convex working face, a platen-controlled presser bar for regulating the speed of rotation of said roll, and a cam operating in conjunction with said bar.

50. A box covering machine comprising means for directing the box in a rectilinear path, and cover-affixing mechanism embodying a presser roll having a shouldered convex working face, a rock-shaft carried by the presser roll and extending transversely thereof, a crank arm on said shaft, a presser bar movable with said shaft, and means for rocking said shaft.

51. A box covering machine comprising means for directing the box in a rectilinear path, and cover-affixing mechanism embodying a presser roll having a shouldered, convex working face, a rock-shaft carried by the presser roll and extending transversely thereof, a crank arm on said shaft, a presser bar movable with said shaft, and a cam for rocking said shaft.

52. A box covering machine comprising means for directing the box in a rectilinear path, and cover-affixing mechanism embodying a presser roll having a shouldered convex working face, a rock-shaft carried by the presser roll, and extending transversely thereof, a crank arm on said shaft, a presser arm on said shaft, a presser bar movable with said shaft, and an adjustable cam for rocking said shaft.

53. A box covering machine comprising means for directing the box in a rectilinear path, and cover-affixing mechanism embodying a presser roll having a shouldered convex working face, a rock-shaft carried by the presser roll and extending transversely thereof, a crank arm on said shaft, a presser bar movable with said shaft, and cam and spring elements for rocking said shaft back and forth.

54. A box covering machine comprising means for directing the box in a rectilinear path, and cover-affixing mechanism embodying a presser roll having a shouldered convex working face, a rock-shaft carried by the presser roll and extending transversely thereof, a hanger for said shaft adjustable on the shaft of the presser roll, a crank arm on said shaft, and means for rocking the shaft.

55. A box covering machine comprising means for directing the box in a rectilinear path, and cover-affixing mechanism embodying a presser roll having a shouldered convex working face, a pair of rock-shafts carried by the presser roll and extending transversely thereof, hangers for said shaft adjustable on the shaft of the presser roll, a tie-bar connecting said hangers, crank arms on said rock-shafts, and means for operating said crank arms.

56. A box covering machine comprising means for directing the box in a rectilinear path, and cover-affixing mechanism embodying a presser roll having a shouldered convex working face, a rock-shaft carried by the presser roll and extending transversely thereof, a hanger for said shaft adjustable on the shaft of the presser roll, a crank arm on said shaft, a disk on the presser roll for controlling the travel of the presser foot, and means for rocking the shaft.

57. A box covering machine comprising cover-affixing mechanism, and means for directing the box in a rectilinear path past the cover-affixing mechanism embodying a sectional telescopic plunger, a counter-balance weight for said plunger, means connected with said weight for limiting the upward movement of the plunger, and a flexible connection attached to the weight at one point and to one of the plunger sections at another point.

58. A box covering machine comprising plunger mechanism for directing the box in a rectilinear path, and cover-affixing mechanism embodying a unit frame, a sliding member on said frame and end tucker fingers carried by said sliding member and each comprising a plurality of blades one of which is mounted for adjustment in the direction of movement of the box to conform to the height of the shoulder of the box.

59. In a box covering machine, means for advancing the box in a rectilinear path, and cover-affixing mechanism embodying tuck-in and wipe-on fingers operating to wipe the cover wrap against the inside of the box, and end tuckers which remain in contact with box ends during the operation of the tuck-in and wipe-on fingers so as to resist the outward lateral pressure of said fingers at the box corners.

60. In a box covering machine, means for advancing the box in a rectilinear path, and cover-affixing mechanism embodying tuck-in and wipe-on fingers operating with a yielding pressure to wipe the cover wrap against the inside of the box, and end tuckers which remain in contact with box ends during the operation of the tuck-in and wipe-on fingers so as to resist the outward lateral pressure of said fingers at the box corners.

61. In a box covering machine, means for advancing the box in a rectilinear path, and cover-affixing mechanism embodying a unit driving shaft, an adjustable unit frame, cover affixing elements on said unit frame, a cam shaft on the unit frame for operating said cover-affixing elements, a slidable bevel gear arranged to travel lengthwise of said driving shaft, and a bevel gear on the cam shaft meshing with said slidable bevel gear.

62. In a box covering machine, means for advancing the box in a rectilinear path, and cover-affixing mechanism embodying a pressure-resisting plate, and means for imparting reciprocatory movement to said pressure-resisting plate in a plane perpendicular to the movement of the box.

63. A box covering machine comprising plunger mechanism for directing the box in a rectilinear path, and cover affixing mechanism embodying a presser roll, and means for turning said roll and also sliding the same bodily while the roll is turning.

64. A box covering machine comprising upper and lower box carrying plungers, and cover-affixing members consisting of tuck-in and wipe-on fingers operating at right angles to the direction of movement of the box and also having a limited stroke in the direction of movement of the box, means on the fingers for causing the same to fold the flap portions of the cover wrapper down and wipe the same against the inside of the box, and means for reciprocating said fingers independently of the upper plunger.

65. A box covering machine comprising plunger mechanism for directing the box in a rectilinear path, turn in and wipe on fingers movable in the direction of movement of the box independently of the top plunger, parallel pressure resisting plates to resist outward pressure on two sides of the box in one part of the box's travel, other parallel pressure resisting plates to resist the outward pressure on the other two sides of the box in another part of the box's travel, and cam-controlled means for imparting reciprocatory movement to said pressure resisting plates.

66. A box covering machine comprising upper and lower box carrying plungers, and cover-affixing members consisting of tuck-in and wipe-on fingers operating at right angles to the direction of movement of the box and also having a limited stroke in the direction of movement of the box, means on the finger to fold the flap portions of the cover wrapper down and wipe the same against the inside of the box and to move the fingers inwardly away from the inside of the box after the wrapper is wiped thereon, and means for reciprocating said fingers independently of the upper plunger.

67. In a box covering machine, the combination of a mechanism for carrying a box and cover therefor, with a cover-affixing mechanism including tuck-in and wipe-on fingers, means for first moving the fingers to apply the marginal portions of the cover to the inside of the box and then move the fingers inwardly out of engagement with the applied portion of the cover, end tuckers operating substantially in synchronism with the said fingers, and means for deflecting the end tuckers laterally from the ends of the box at about the same time the fingers are moved inwardly out of engagement with the applied marginal portion of the cover.

68. In a box covering machine, the combination of a mechanism for carrying a box and cover therefor, with a cover-affixing mechanism, the former including tuck-in and wipe-on fingers, means for first moving the fingers to apply the marginal portions of the cover to the inside of the box and later moving the fingers inwardly out of engagement with the applied portion of the cover, end tuckers operating substantially in synchronism with the said fingers, means for deflecting the end tuckers laterally from the ends of the box at about the same time the said members are moved inwardly out of engagement with the applied marginal portions of the cover, and a pressure-resisting plate arranged to engage the box as the fingers wipe on the marginal portion of the cover and to disengage the box as the members move out of engagement with such applied marginal portion of the cover.

69. A box covering machine comprising a box and wrapper carrying mechanism, and a cover affixing mechanism consisting of turn-in and wipe-on fingers operating at right angles to the direction of movement of the box and also having a limited stroke in the direction of movement of the box, means on the fingers to fold the flap portions of the wrapper down and wipe the same against the inside of the box and to move the fingers inwardly away from the inside of the box after the wrapper is wiped thereon, and means for reciprocating the fingers.

In testimony whereof we affix our signatures in presence of two witnesses.

JOHN P. MARKERT.
ROBERT S. BOLGER.

Witnesses:
 Gus A. Meyer,
 W. J. Troutwein.

Copies of this patent may be obtained for five cents each, by addressing the "Commissioner of Patents, Washington, D. C."